United States Patent [19]

Auberry et al.

[11] Patent Number: 4,523,346
[45] Date of Patent: Jun. 18, 1985

[54] METHOD AND DEVICE FOR THE MANUFACTURE OF FOOTWEAR

[75] Inventors: Horace Auberry; Anton Liebscher; Sven Oberg, all of Waynesville, N.C.

[73] Assignee: Ro-Search, Incorporated (Ro-Search), Waynesville, N.C.

[21] Appl. No.: 522,333

[22] Filed: Aug. 11, 1983

[51] Int. Cl.³ .................. A43D 3/00; A43D 65/02; A43D 65/00
[52] U.S. Cl. ............... 12/133 R; 12/133 B; 12/145; 264/244; 425/129 S
[58] Field of Search ............ 425/129 S, 119; 264/244; 12/133 R, 133 B, 145, 142 D, 142 T

[56] References Cited

U.S. PATENT DOCUMENTS

| | | | |
|---|---|---|---|
| 1,121,236 | 12/1914 | Dunbar | 12/133 R |
| 2,799,034 | 7/1957 | Crowell et al. | 425/119 |
| 3,315,317 | 4/1967 | Winkler | 425/119 |
| 3,449,190 | 3/1970 | Ludwig | 425/129 S |
| 3,676,542 | 7/1972 | Maltby | 425/129 S |
| 3,696,455 | 10/1972 | Batchelder et al. | 12/145 |

FOREIGN PATENT DOCUMENTS

| | | | |
|---|---|---|---|
| 1128327 | 4/1962 | Fed. Rep. of Germany | 264/244 |
| 1118702 | 6/1956 | France | 425/119 |
| 1295561 | 4/1962 | France | 425/119 |
| 797746 | 7/1958 | United Kingdom | 264/244 |

Primary Examiner—Werner H. Schroeder
Assistant Examiner—Steven N. Meyers
Attorney, Agent, or Firm—Jay M. Cantor

[57] ABSTRACT

The disclosure relates to the manufacture of footwear with direct molded elastomeric soles wherein the last is built up in the center region to provide a sole which appears thick externally, yet is thin and relatively lightweight in its center region. The last includes grooves over the region of the stitches securing the upper to the welt to seal and waterproof the footwear in the region of the stitches by permitting the sole material, when molding takes place, to flow over the stitches.

20 Claims, 8 Drawing Figures

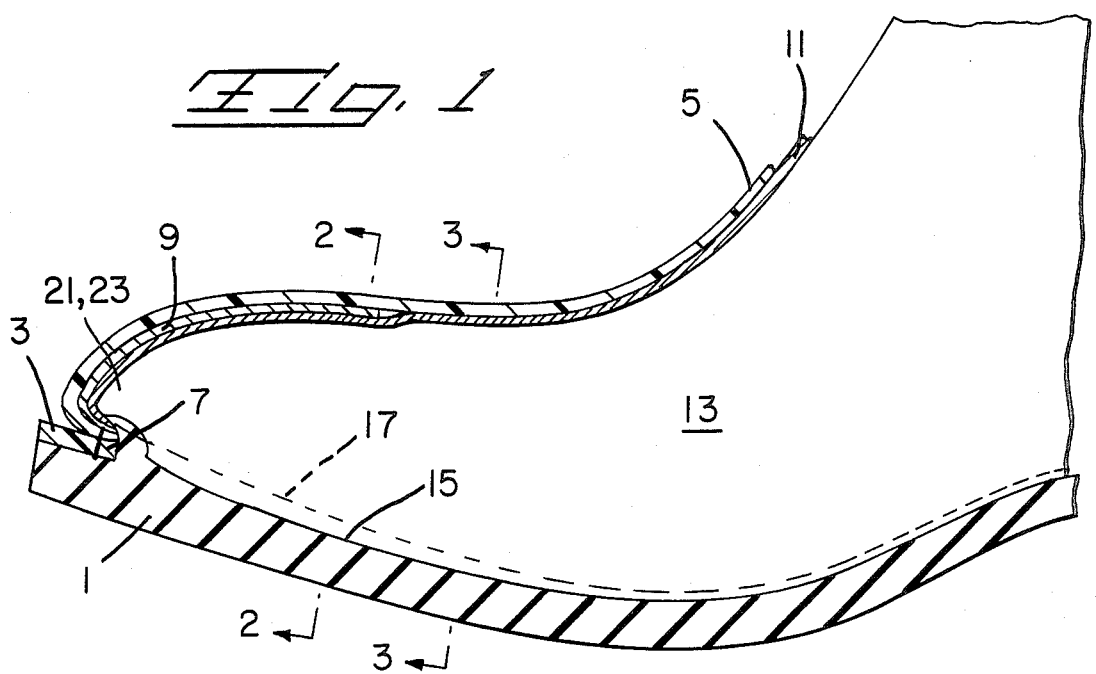
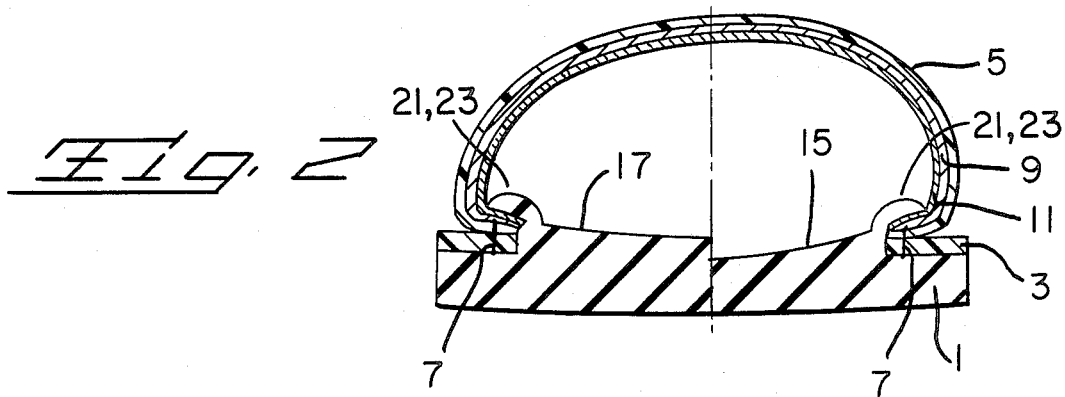
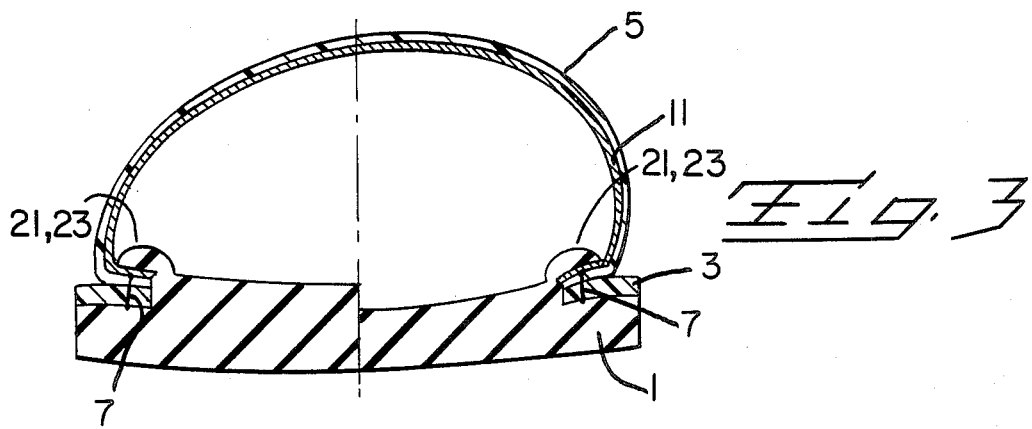

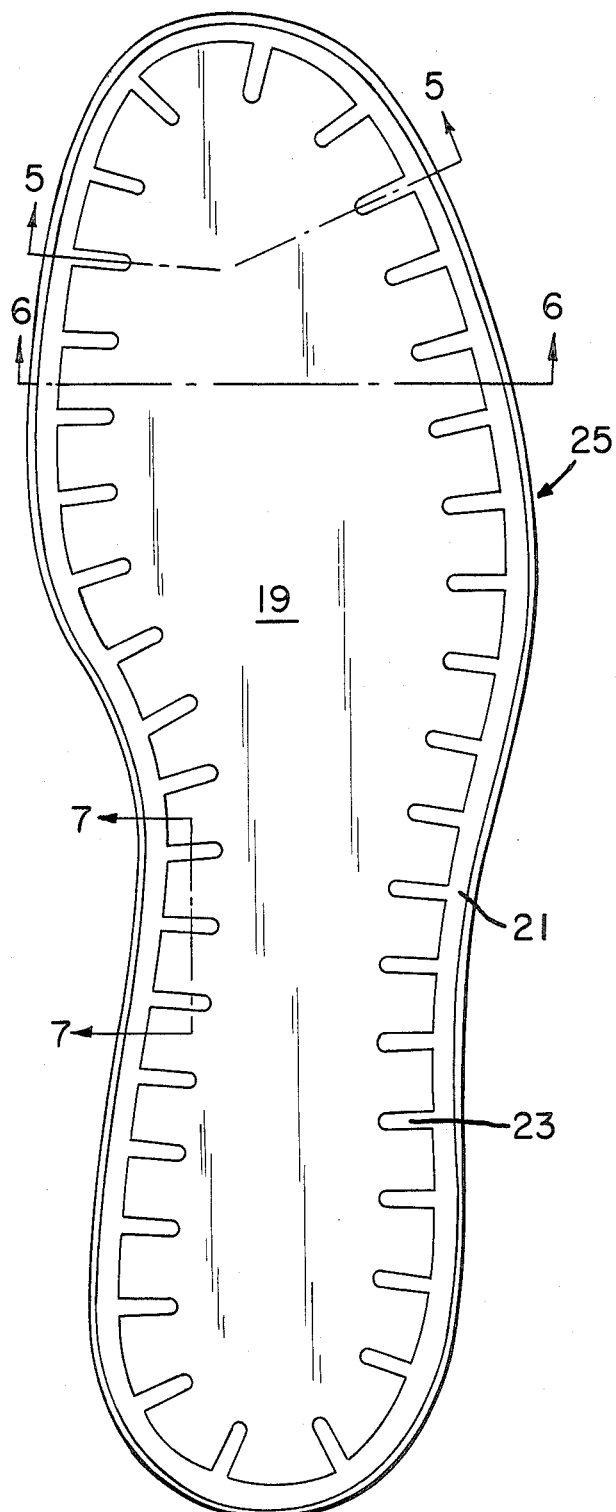
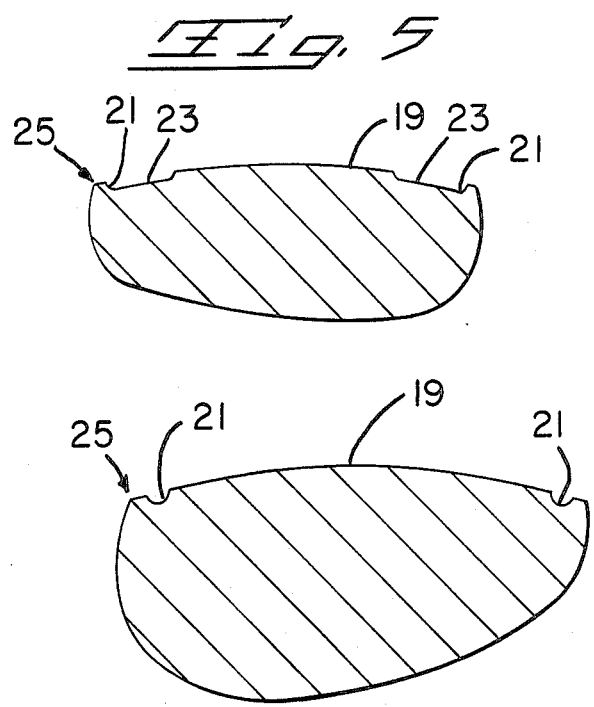
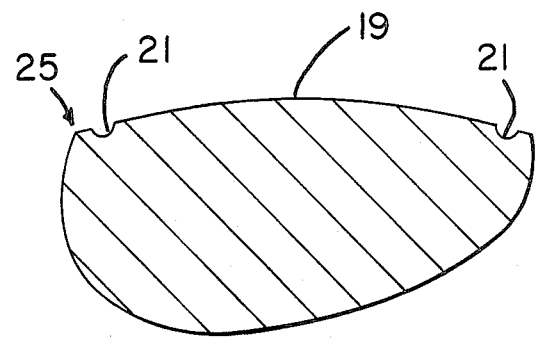
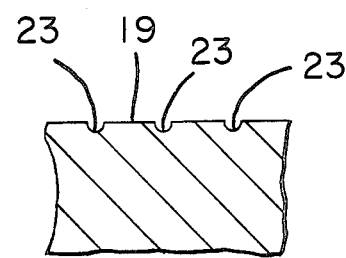
Fig. 4
Fig. 5
Fig. 6
Fig. 7

METHOD AND DEVICE FOR THE MANUFACTURE OF FOOTWEAR

BACKGROUND OF THE INVENTION

1. Field of the Invention

This invention relates to improvements in the manufacture of footwear with direct molded elastomeric soles by use of pre-welted uppers.

2. Description of the Prior Art

In the manufacture of footwear, it is known to mold soles of rubber, PVC, polyurethane or other elastomers directly to a welt which has been stitched in endless form to a shoe upper. Pat. No. 3,758,903 discloses a method and device for the lasting of footwear uppers and attaching an elastomeric sole by means of the same device to such pre-welted uppers. While footwear produced by the method and apparatus disclosed in said patent has attained great commercial success due to its high quality, it is desirable to provide footwear having the appearance of a thick sole, yet having the weight of a thin sole with the added concomitant feature of greater toe room. Also, occasionally, the seam between the upper and the welt is not completely enclosed by the elastomer, thereby permitting seepage of liquid into the footwear interior.

SUMMARY OF THE INVENTION

In accordance with the present invention, the above noted problems of the prior art are substantially overcome and there is provided footwear of thick sole appearance yet thin soled and light and with greatly improved waterproofing properties. Briefly, the above is accomplished by utilizing an upper having an attached seamless welt of rubber, PVC or other elastomer which has been pre-molded to the precise shape and size for a particular style and size of upper.

Such pre-shaped welt can also be of leather. However, leather is rather expensive and the inside of such seamless leather welt would be wasted, so leather becomes economically unfeasible.

Depending on the elastomer used and the ruggedness of the footwear to be produced, the pre-molded welt may be reinforced by textile or non-woven strips, partly or fully embedded in the welt material.

The upper surface of the pre-molded welt, i.e., the surface visible in the finished foowear, may be embossed, stitched, painted or otherwise decorated, adding to the cosmetic appeal of the finished footwear.

The welt is pre-molded to the exact circumference and profile of the sole which is to be molded thereto. This circumference and profile having been predetermined by the particular style and size of the mold last which is itself designed to give the desired shape and foot fit characteristic to the finished shoes. The welt is then stitched a precise distance from the bottom edge of the upper, using well known gauge techniques, thus insuring that the bottom of the upper will itself take the profile and circumference of both the featheredge of the last and its matching sole.

Locating marks molded in the welt are matched as the welt is stitched with appropriate nicks cut in the upper, insuring that the upper margin is correctly married to the welt, gathered or stretched as the last configuration demands. Pleats resulting from the gathering of the bottom edge of the upper as it is transferred from the flat to the three-dimensional shape of the last, which often impeded the flow of the sole material underneath and around the narrow margin of the upper which is turned under the molding last in the prior art, no longer present a problem in view of the formation of a longitudinal groove around the last bottom just within the featheredge and grooves perpendicular thereto to permit the flow of elastomer over the stitching of the welt to upper. Such grooves in the last bottom act as runners, allowing the elastomeric material to flow to the very featheredge of the last irrespective of pleats, tightness of the upper or width of margin. This provides consistently controlled and maximized flow of the sole material to provide a smooth shoe interior and, most importantly, to thoroughly seal and waterproof the stitched seam attaching the welt to the upper.

While smoothness on the inside of the footwear could be obtained by higher pressure during the molding operation in the conventional form of direct molding the soles to the uppers, such approach is not desirable when following the advocated pre-welted molding operation as disclosed in the above referred to Pat. No. 3,758,903. A predetermined relationship between the side frame and the last is maintained, making direct pressure on the inside of the footwear upper undesirable.

The grooves provided in the last bottom of the mold are of sufficient depth to serve the purpose of uniform distribution of the elastomeric material on the bottom of the footwear, but not so deep as to be noticeable to the wearer, once covered by the normal insert sock lining.

A further aspect of the invention particularly desirable for footwear with thick appearing soles yet which are light weight and use a minimum of material, is to deform the mold last in relation to the ideal so that the juncture of the premolded welt and the sole occurs not at the normal featheredge but at a distance, preferably $\frac{1}{8}''$ up from the said featheredge. This is accomplished by removing material around the edge of the mold last to the level of the desired juncture of welt, all by building up the bottom of the mold last. The degree of taper from the new sole and welt juncture back to the ideal last bottom is chosen so that the inside of the shoe still feels smooth and comfortable to the foot and the original shoe fit is maintained. The build-up of the last bottom in the toe portion provides more toe room.

BRIEF DESCRIPTION OF THE DRAWINGS

FIG. 1 is a cross-section of a shoe with a last therein made in accordance with the present invention;

FIG. 2 is a view taken along the line 2—2 of FIG. 1;

FIG. 3 is a view taken along the line 3—3 of FIG. 1;

FIG. 4 is a top view of the last bottom in accordance with the present invention;

FIG. 5 is a view taken along the line 5—5 of FIG. 4;

FIG. 6 is a view taken along the line 6—6 of FIG. 4;

FIG. 7 is a view taken along the line 7—7 of FIG. 4; and

FIG. 8 is a view of a mold and mold frame for producing shoes in accordance with the present invention.

DESCRIPTION OF THE PREFERRED EMBODIMENT

Referring to FIGS. 1 to 3, there is shown a shoe formed in accordance with the present invention. The above shoe includes a sole 1 secured to a seamless welt 3 which is stitched to an upper 5 by stitches 7. A steel toe cap 9 is positioned in the toe region between the upper 5 and a lining 11. A last 13 is positioned within the shoe to provide shaping of the upper as well as to form a portion of the mold for formation of the sole 1 as explained in detail in the above noted patent. The bottom contour of the last 13 is built up by adding thereto the portion between the sole top 15 and the location of the bottom contour of a standard positioned last noted as 17 at the dashed line in FIG. 1. This change in shape of the last 13 is better shown in FIGS. 2 and 3 where the standard last shape is shown on the left and the altered last contour on the right. It is readily apparent that the external appearance of the sole is the same on both sides of the shoe. However, the toe room within the shoe is increased and the sole thickness and weight are reduced in the sole center region.

In the formation of footwear as noted in FIGS. 1 to 3 and the above noted patent, due to the stitching 7 which secures the upper 5 to the welt 3, liquids, such as water, can pass to the shoe interior through the holes formed by the stitching since the lining 11 does not provide a waterproof seal around the stitches and the sole material, during sole formation, does not completely pass over and waterproof the stitching. To alleviate this problem, the last bottom 19, as shown in FIGS. 4 to 7, is provided with a longitudinal groove 21 completely encircling the last bottom positioned about one sixteenth of an inch inside the featheredge 25 with a plurality of spaced grooves 23 positioned about the last bottom which are perpendicular to and communicate with the longitudinal groove. By use of the above described last, the elastomer not only forms the sole 1 along the welt 3 and mold form but, also, the elastomer travels along the grooves 23 to the longitudinal groove 21 to fill said grooves with elastomer. The longitudinal groove 21 is positioned over the stitches 7 to provide a waterproof seal thereabove within the shoe and prevent liquid from entering the shoe interior through the holes formed by the stitches.

A typical last and mold arrangement which can be used in accordance with the present invention, as set forth in the above mentioned U.S. Pat. No. 3,758,903, is set forth in FIG. 8. According to the invention, each arm 32 of the turret 31 carries a last 33 differing in dimensions, such as right or left, width or size, from the last carried by the next turret arm. The operator places an upper 35 on the last carried by the turret arm in mounting position 36. When the turret 31 is indexed (manually or by power means), the upper 35 moves into the molding position 37 where the molding compound is injected into the cavity formed by the mold 38, the usually split side frame 39 and the piston 40 with the configuration of the sole bottom. The piston or sole pressure plate 40 rests on the molding table 41, which might be chilled to reduce the time needed for the sole compound to solidify.

The invention provides further that the side frame 39 fitting the specific last is placed into the desired final position in relation to the last and the upper placed thereon while the turret arm is still in the mounting position. This allows not only easy visual inspection of the seating of the upper on the last but also lengthens the cooling time in the molding position.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method for making footwear with elastomeric soles lasted without a structural insole, comprising:
    (a) providing an upper with a welt stitched thereto,
    (b) providing a last with grooves on the last bottom substantially tracking said stitches,
    (c) placing said last within said upper with said grooves closely adjacent said stitches; and
    (d) forming a sole secured to said upper which includes said groove and the region between said grooves and said stitches.

2. A method as set forth in claim 1 wherein said welt is a molded seamless welt.

3. A method as set forth in claim 1 wherein said last bottom slopes away from the last body from the featheredge to the last bottom central region.

4. A method as set forth in claim 2 wherein said last bottom slopes away from the last body from the featheredge to the last bottom central region.

5. A last which comprises:
    (a) a last body including a last bottom, said last bottom including
    (b) a feather edge,
    (c) a longitudinal groove positioned within said featheredge and closely adjacent thereto, and
    (d) a plurality of other grooves communicating with said longitudinal groove spaced around said last bottom.

6. A last as set forth in claim 5 wherein said other grooves are substantially perpendicular to said longitudinal groove at their region of communication.

7. A last as set forth in claim 5 wherein said longitudinal groove is continuous.

8. A last as set forth in claim 6 wherein said longitudinal groove is continuous.

9. A last as set forth in claim 5 wherein said last bottom is sloped away from said last body in a direction from said featheredge to the interior of said last bottom.

10. A last as set forth in claim 6 wherein said last bottom is sloped away from said last body in a direction from said featheredge to the interior of said last bottom.

11. A last as set forth in claim 7 wherein said last bottom is sloped away from said last body in a direction from said featheredge to the interior of said last bottom.

12. A last as set forth in claim 8 wherein said last bottom is sloped away from said last body in a direction from said featheredge to the interior of said last bottom.

13. An apparatus for making footwear comprising:
    (a) a mold including a mold frame and a mold top in the form of a last, said last having a last bottom which includes:
    (b) a feather edge,
    (c) a longitudinal groove positioned within said featheredge and closely adjacent thereto, and
    (d) a plurality of other grooves communicating with said longitudinal groove spaced around said last bottom.

14. An apparatus as set forth in claim 13 wherein said other grooves in said last are substantially perpendicular to said longitudinal groove at their region of communication.

15. An apparatus as set forth in claim 13 wherein said longitudinal groove in said last is continuous.

16. An apparatus as set forth in claim 14 wherein said longitudinal groove in said last is continuous.

17. An apparatus as set forth in claim 13 wherein said last bottom is sloped away from said last body in a direction from said featheredge to the interior of said last bottom.

18. An apparatus as set forth in claim 14 wherein said last bottom is sloped away from said last body in a direction from said featheredge to the interior of said last bottom.

19. An apparatus as set forth in claim 15 wherein said last bottom is sloped away from said last body in a direction from said featheredge to the interior of said last bottom.

20. An apparatus as set forth in claim 16 wherein said last bottom is sloped away from said last body in a direction from said featheredge to the interior of said last bottom.

* * * * *